March 10, 1925.

R. C. TEMPLIN 1,528,959

AUTOMOBILE LOCK MECHANISM

Filed Dec. 15, 1922

Inventor
R. C. Templin
By Lancaster and Allwine
Attorneys

March 10, 1925.
R. C. TEMPLIN
AUTOMOBILE LOCK MECHANISM
Filed Dec. 15, 1922
1,528,959
2 Sheets-Sheet 2
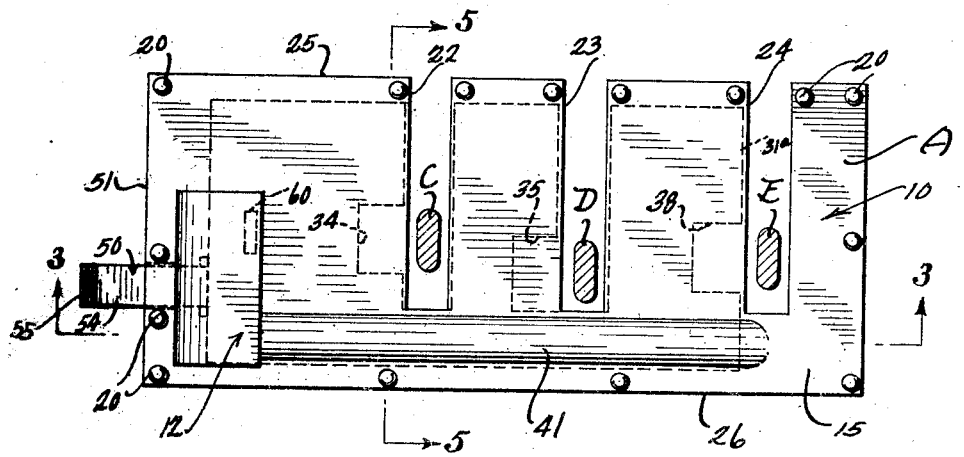
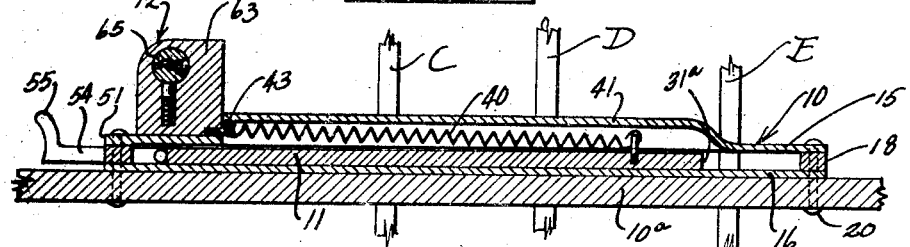
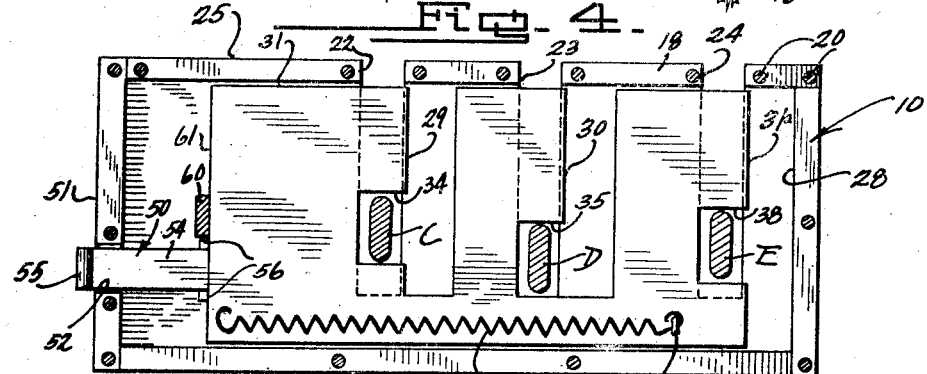
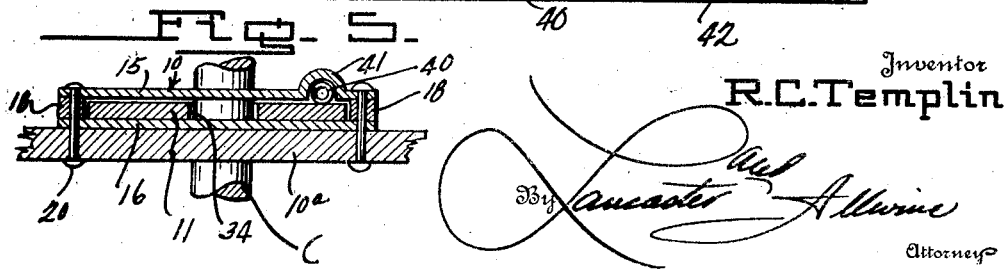
Inventor
R.C.Templin
Attorney Patented Mar. 10, 1925.

1,528,959

UNITED STATES PATENT OFFICE.

RAYMOND C. TEMPLIN, OF COATESVILLE, PENNSYLVANIA.

AUTOMOBILE LOCK MECHANISM.

Application filed December 15, 1922. Serial No. 607,177.

*To all whom it may concern:*

Be it known that I, RAYMOND C. TEMPLIN, a citizen of the United States, residing at Coatesville, in the county of Chester and State of Pennsylvania, have invented certain new and useful Improvements in Automobile Lock Mechanisms, of which the following is a specification.

This invention relates to improvements in devices to lock automotive vehicles in order that the same may be protected against unauthorized use.

The primary object of this invention is the provision of a locking mechanism adapted for use in connection with the operating levers or pedals of automotive vehicles, and in this respect providing a highly satisfactory lock by means of which the levers may be locked in a determined relation as to prevent unauthorized use of the vehicle.

A further object of this invention is the provision of a device of the above mentioned character, which is specifically adapted for use in connection with conventional "Ford" vehicles, embodying means which will selectively permit the operation of, or prevent the operation of, the clutch, reverse, and brake pedals as used upon such type of vehicle.

A further object of this invention is the provision of an improved automobile locking mechanism, embodying features tending to make the same durable and efficient, and which may not be tampered with when in locked position by reason of the novel protecting arrangement embodied therein.

Other objects and advantages of this invention will be apparent during the course of the following detailed description.

In the accompanying drawings, forming a part of this specification, and wherein similar reference characters designate corresponding parts throughout the several views:

Figure 2 is a plan view of the improved locking mechanism, showing the same in unlocked relation with respect to certain operating levers or pedals.

Figure 3 is a transverse cross sectional view, taken substantially on the line 3—3 of Figure 2.

Figure 4 is a plan view of the improved lock mechanism with a cover plate thereof removed, showing the locking member in locked position with respect to the desired securing of vehicle operating levers or pedals.

Figure 5 is a transverse cross sectional view, taken substantially on the line 5—5 of Figure 2.

Figure 1:
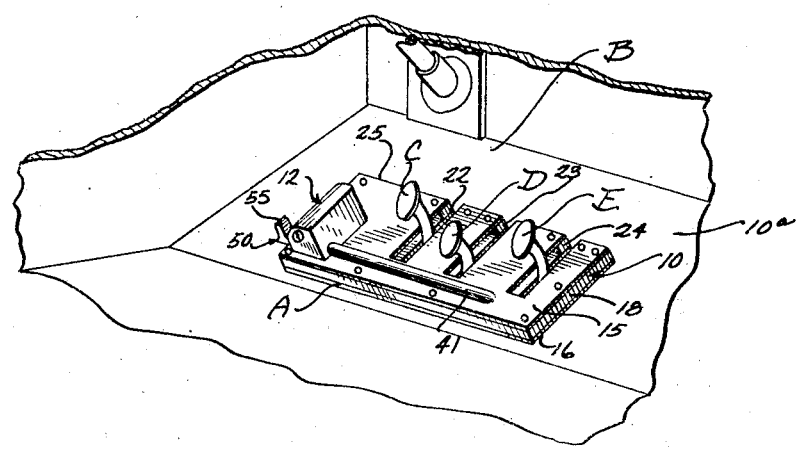
Figure 1 is a perspective view of the pedal arrangement of a "Ford" automobile, showing the application of the improved locking mechanism thereto.
Figure 6:
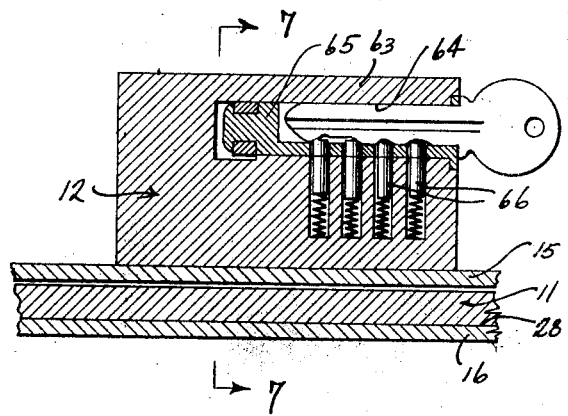
Figure 6 is a cross sectional view, taken substantially on the line 6—6 of Figure 7, and showing the longitudinal construction of a lock which may be embodied in the improved device.
Figure 7:
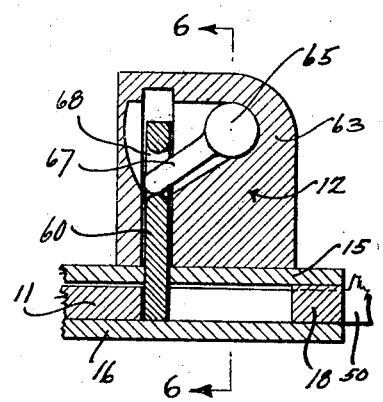
Figure 7 is a transverse cross sectional view, taken substantially on the line 7—7 of Figure 6, and showing the locking bolt in position to retain the pedal lock member in a locked position.
Figure 8:
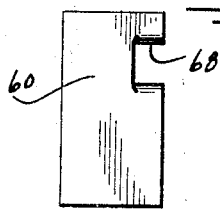
Figure 8 is a front elevation of a lock bolt, which may be used in connection with the invention.

In the drawings, wherein for the purpose of illustration is shown but the preferred embodiment of this invention, the letter A generally designates the improved locking mechanism, adapted for use in connection with automotive vehicle B, as to permit the operable or inoperable positioning of the vehicle levers or pedals C, D, and E.

The improved lock device A will generally be used in connection with "Ford" vehicles, and to this end the pedals C, D, and E are respectively the clutch, reverse, and brake pedals, which extend upwardly through slots in the floor board 10ª. It is, of course, to be understood that the improved lock may be used in connection with other types of vehicles, and that the pedals C, D, and E may be of any number, and of different formations and arrangements.

Referring to the improved lock device A, the same generally comprises the casing 10; lock member, plate or bar 11; and lock 12 for locked positioning of the plate 11.

The support or casing 10 may be of various formations, the primary purpose of the same being that of encased disposal of the locking member 11, so that the parts thereof may be most effectively positioned against liability of an unauthorized person tampering with the same. To this end, the casing 10 includes top and bottom cover plates 15 and 16 respectively, which are maintained in superposed spaced relation, as by means of spacing pieces 18, which are disposed marginally intermediate said plates 15 and 16. Rivets 20, or analogous securing elements may be provided for securing the casing 10 to the floor board or support member 10; these rivets or analogous securing devices 20 being preferably marginally disposed about the casing 10 through the spacing pieces 18. The top and bottom plates 15 and 16 are provided with aligning slots, and when in assembled relation provide the casing 10 with slots 22, 23 and 24, extending inwardly from the forward longitudinal marginal edge 25. These slots terminate short of the rear longitudinal edge 26 of said casing, and are adapted for operably receiving the automobile pedals C, D, and E respectively of the "Ford" type of control.

The locking plate, member, or bar 11, is preferably of some durable metal, and may be of rectangular formation for longitudinal sliding within the chamber 28 provided by the casing 10, intermediate the top and bottom plates thereof. This member 11 is provided with slots 29 and 30 extending inwardly from the forward marginal edge 31 thereof, and which are adapted for complete alignment with the slots 22 and 23 respectively of the casing 10, to permit unimpeded operation of the pedals C and D. When in this position, the side marginal edge 31ª of the plate 11 lies laterally of the other slot 24 in the casing 10, so that the locking plate or member 11 is not in intersecting relation with the slot 24 and hence permits operation of the pedal E. The slots 29 and 30 of the plate 11 are provided with recesses 34 and 35 respectively, which communicate laterally thereof.

A recess 38 is also provided inwardly of the side marginal edge 31ª of the plate 11; all of the recesses 34, 35, and 38 extending inwardly from the marginal edges of the plates with which they communicate in the same direction. These recesses 34, 35, and 38 are adapted for respectively receiving the pedals C, D, and E when the plate 11 is moved laterally within the casing compartment 28, and in order to maintain said pedals or levers in inoperative positions.

A spiral spring 40 is preferably positioned within the casing 10, to normally maintain the locking plate 11 in position whereby the slots thereof align with the slots of the casing to permit operation of the levers C, D, and E. This spring 40 is relatively long, and the top cover plate 15 of the casing 10 is ribbed, as at 41, to provide the longitudinal pocket for compact disposal of the spring 40. One end of the spring 40 is connected to the plate 11, as by a staple 42, while the opposite end of said spring is connected as by a staple 43 to the casing 10, or to the lock 12 to be subsequently described. This spring 40 is normally under tension to retain the plate 11 as is indicated in Figures 2 and 3 of the drawings, to permit operation of the automobile levers C, D, and E. A slide member 50 is reciprocably disposed inwardly of a side edge 51 of the casing 10, the casing having an opening 52 inwardly of said side to permit the sliding of the member 50. This member 50 is preferably free of connection with the plate 11, although the same may be an integral part thereof. It includes the body portion 54 adapted for sliding upon the bottom plate 16, and the outstanding arcuate end 55 for foot engagement, whereby the operator when pushing the member 50 inwardly will engage the same with the plate 11 for forcing said plate 11 into a locking position. To prevent complete detachment of the member 50 from the casing 10, lugs 56 may be provided inwardly of the casing on the body portion 54. It can well be understood that as the plate 11 is moved to an unlocked position by the spring 40, the operating member 50 will likewise be forced to extend from the casing 10, as is illustrated in Figures 2 and 3 of the drawings. The purpose of providing this member 50 free of connection with the plate 11 is that the plate 11 may be additionally safeguarded against mutilation or removal from a locked position, as it is obvious that the plate 11 when in its locked position provides no marginal edges or projections whereby a thief could insert a tool for prying the same open.

The lock device 12 may be of any approved construction, and includes the bolt member 60 which is adapted for operation transversely of the plane of the casing 10, in order that the same may cooperate against the side edge 61 of the locking plate 11 when in its locked position. The lock 12 may specifically include a block or housing 63, welded or otherwise secured exteriorly upon the cover plate 15, and including a chamber 64 therein for oscillatively receiving the key barrel 65. Tumblers 66 may cooperate with the barrel 65 in ordinary locking manner. It is preferred that the inner end of the oscillatively mounted barrel 65 have a finger 67 for cooperation within a slot 68 provided within the bolt 60b, whereby said bolt 60 may be elevated into unlocked relation or lowered into locked relation with respect to the plate 11.

From the foregoing description of this invention, it is obvious that an improved locking mechanism for automotive vehicles has been provided which is very efficient in operation, in that the means for locking the levers is secretly positioned or protectively encased against liability of being easily tampered with. It is to be noted that when the locking plate 11 is in its locked position, as is illustrated in Figure 4 of the drawings, the recesses 34, 35 and 38 extend transversely in aligning relation with a portion of the slots 22, 23, and 24, so that the portions of the locking plate 11 on each side of said recesses extend entirely transversely of the slots in the casing 10, in order that a thief cannot insert a prying tool at any edge portion of the locking portion or member 11 to effect a prying action. The improved device A is preferably adapted for exterior mounting upon the floor boards 10ª, although it is contemplated that the same may be disposed beneath said floor boards in an out-of-the-way position. When so disposed, the slide member 50 for operating the locking plate or bar 11 will have to be of different formation, so that an operator may conveniently engage the same with his foot for operation of the plate 11. This type of lock is, of course, more effective than the steering wheel lock, in that the vehicle may be moved, although not operated under its own power. This is in conformity with police regulations in general enforcement throughout the country. The lock is more effective than the ordinary vehicle wheel lock, in that the same may not be easily tampered with or mutilated.

Various changes in the shape, size, arrangement of parts may be made to the form of the improved locking device herein shown and described, without departing from the spirit of the invention or the scope of the claims.

I claim:

1. A lever lock comprising a cover plate having a slot therein, a member movable beneath said cover plate having a slot therein with a recess communicating with said slot, said member adapted to be moved whereby the slot will be positioned in aligning relation with the cover slot or whereby the recess may be aligned partially with the slot of said cover plate, and means for locking the member in the last mentioned position.

2. A lever lock comprising a casing having a slot extending inwardly from an edge thereof, a locking plate movably encased within said casing having a slot extending inwardly from an edge thereof and a recess extending inwardly from an edge of said slot, said plate being so movable within said casing as to have the slot thereof align with the slot of the casing or whereby the recess of the same may align with the slot of said casing, and means for locking said plate in the last mentioned position.

3. An automobile locking device for operating levers thereof comprising a casing including top and bottom plates having slots therein, and means mounting said plates in spaced relation whereby said slots are in alignment, a locking member having slots therein and recesses communicating with said slots, means permitting operation of the locking member intermediate said plates whereby the slots of said member may align with the slots of said casing, or whereby the recesses of said member may align with the slots of said casing so that portions on each side of said recesses extend transversely across said slots, and means to lock said member in the last mentioned position in said casing.

4. In a device of the class described, the combination of a support having a slot therein for receiving an operating lever, a member movable in covered relation in said support having recesses extending inwardly from an edge thereof, and means for locking said member in position whereby the recess extends in partial alignment with the slot of said support to maintain said lever in an inoperative position, the portion of said member on each side of the recess thereof extending entirely across the slot within said support.

5. A device for locking vehicle control levers comprising a casing mounted for normal operation of said levers, a lock member slidable in said casing and concealed thereby and adapted to be positioned to inoperably lock said levers with respect to movement of the same, and means slidably carried by the casing for moving the lock member to an operative position.

6. A device for locking pedals of automotive vehicles comprising in combination a casing including a spaced top and bottom plates having aligning slots therein open at an edge of said casing, a locking plate slidable in said casing intermediate said plate having slots therein, and recesses communicating with said slots and with certain edges of said plate, all of said recesses opening in the same direction, spring means normally maintaining said locking plate in position for alignment of the slots of said plate and casing whereby the vehicle pedals may be operated in unobstructed relation through the slots of said casing, an operating member free of connection with said locking plate adapted for manual operation to shove said locking plate whereby the pedals are inoperably locked in the recesses of said locking plate, and a lock mechanism including a bolt adapted for engaging said locking plate to maintain the same in a locked relation for inoperative positioning of said pedals.

RAYMOND C. TEMPLIN.